US011662947B2

(12) United States Patent
Cho

(10) Patent No.: US 11,662,947 B2
(45) Date of Patent: May 30, 2023

(54) MEMORY SYSTEM AND DATA PROCESSING SYSTEM PERFORMING OPERATION ON COMMANDS BEFORE FETCHING OF COMMANDS

(71) Applicant: SK hynix Inc., Icheon-si (KR)

(72) Inventor: Hung Yung Cho, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/238,935

(22) Filed: Apr. 23, 2021

(65) Prior Publication Data

US 2022/0083271 A1 Mar. 17, 2022

(30) Foreign Application Priority Data

Sep. 15, 2020 (KR) .................. 10-2020-0118428

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/0655; G06F 3/0611
See application file for complete search history.

(56) References Cited

U.S. PATENT DOCUMENTS

| 10,482,934 B2 | 11/2019 | Teh |
| 11,494,318 B2 | 11/2022 | Cho |
| 2012/0297135 A1 | 11/2012 | Mathew et al. |
| 2015/0113305 A1 | 4/2015 | Shin et al. |
| 2017/0060422 A1* | 3/2017 | Sharifie ................. G06F 3/0679 |
| 2017/0286205 A1* | 10/2017 | Jeong ....................... G06F 13/24 |
| 2018/0275921 A1* | 9/2018 | Katagiri .............. G06F 13/1673 |
| 2018/0321987 A1* | 11/2018 | Benisty ................. G06F 3/0659 |
| 2021/0051455 A1 | 2/2021 | Panergo et al. |
| 2021/0089458 A1* | 3/2021 | Fruchter ............... G06F 3/0679 |

FOREIGN PATENT DOCUMENTS

KR 20200114149 A 10/2020

OTHER PUBLICATIONS

Jung, M. et al., "Design of a Host Interface Logic for GC-Free SSDs." IEEE Transactions on Computer-Aided Design of Integrated Circuits and Systems, vol. 39, No. 8, Aug. 2020, 14 pages.
Non-Final Office Action dated Mar. 3, 2022 in U.S. Appl. No. 17/239,463, pp. 19-31.
Notice of Allowance dated Jun. 27, 2022 in U.S. Appl. No. 17/239,463, pp. 13-18.

\* cited by examiner

*Primary Examiner* — Tracy A Warren
(74) *Attorney, Agent, or Firm* — Perkins Coie LLP

(57) ABSTRACT

A data processing system is provided to include a memory system to store data and information; and a host in communication with the memory system and including a submission queue for queueing a command to be processed by the memory system, the host configured to provide the memory system with a submission queue tail pointer indicating a tail of the submission queue and command information on a command, wherein the memory system is configured to receive command information on the command, performs a pre-operation on the command based on the command information, and fetches the command from the submission queue based on a result of the pre-operation.

17 Claims, 5 Drawing Sheets

MEMORY SYSTEM AND DATA PROCESSING SYSTEM PERFORMING OPERATION ON COMMANDS BEFORE FETCHING OF COMMANDS

CROSS-REFERENCE TO RELATED APPLICATION

This patent document claims priority and benefits to Korean Patent Application No. 10-2020-0118428 filed on Sep. 15, 2020, which is incorporated herein by reference in its entirety.

TECHNICAL FIELD

Various embodiments of the disclosed technology relate to a memory system and a data processing system including the memory system.

BACKGROUND

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

As memory systems do not need a mechanical driving part, the memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are related to a memory system capable of performing a pre-operation for processing a command even before the command is fetched after a host rings a doorbell. Various embodiments are related to a memory system capable of reducing a processing time of the command by performing the pre-operation and successfully providing a response to the host. The technical problems to be achieved by the present embodiment are not limited to the technical problems described above, and other technical problems may be inferred from the following embodiments.

In accordance with an embodiment, a data processing system includes: a memory system to store data and information; and a host in communication with the memory system and including a submission queue for queueing a command to be processed by the memory system, the host configured to provide the memory system with a submission queue tail pointer indicating a tail of the submission queue and command information on the command, wherein the memory system is configured to receive command information on the command, performs a pre-operation on the command based on the command information, and fetches the command from the submission queue based on a result of the pre-operation.

In accordance with some implementations of the disclosed technology, a memory device configured to store data; a host interface in communication with a host and configured to receive a submission queue tail pointer and command information on a command corresponding to the tail pointer from the host, perform a pre-operation on the command based on the command information, and fetch the command from a submission queue of the host based on a result of the pre-operation; a command queue configured to queue a fetched command; and a processor in communication with the memory device and configured to control the memory device to process the command queued in the command queue.

In accordance with some implementations of the disclosed technology, it is possible to provide a memory system capable of performing a pre-operation for processing a command even before the command is fetched after a host rings a doorbell. In accordance with some implementations of the disclosed technology, it is possible to provide a memory system capable of reducing a processing time of the command by performing the pre-operation and successfully providing a response to the host.

Effects achievable in the present disclosure are not limited to the aforementioned effects and other unmentioned effects will be clearly understood by those skilled in the art from the following description.

DETAILED DESCRIPTION

Hereinafter, a preferred embodiment of the disclosed technology will be described in detail with reference to the accompanying drawings. It is noted that in the following description, only parts necessary for understanding an operation in accordance with the present disclosure will be described and a description of parts other than the parts will be omitted in order not to obscure the subject matter of the present disclosure.

Figure 1:
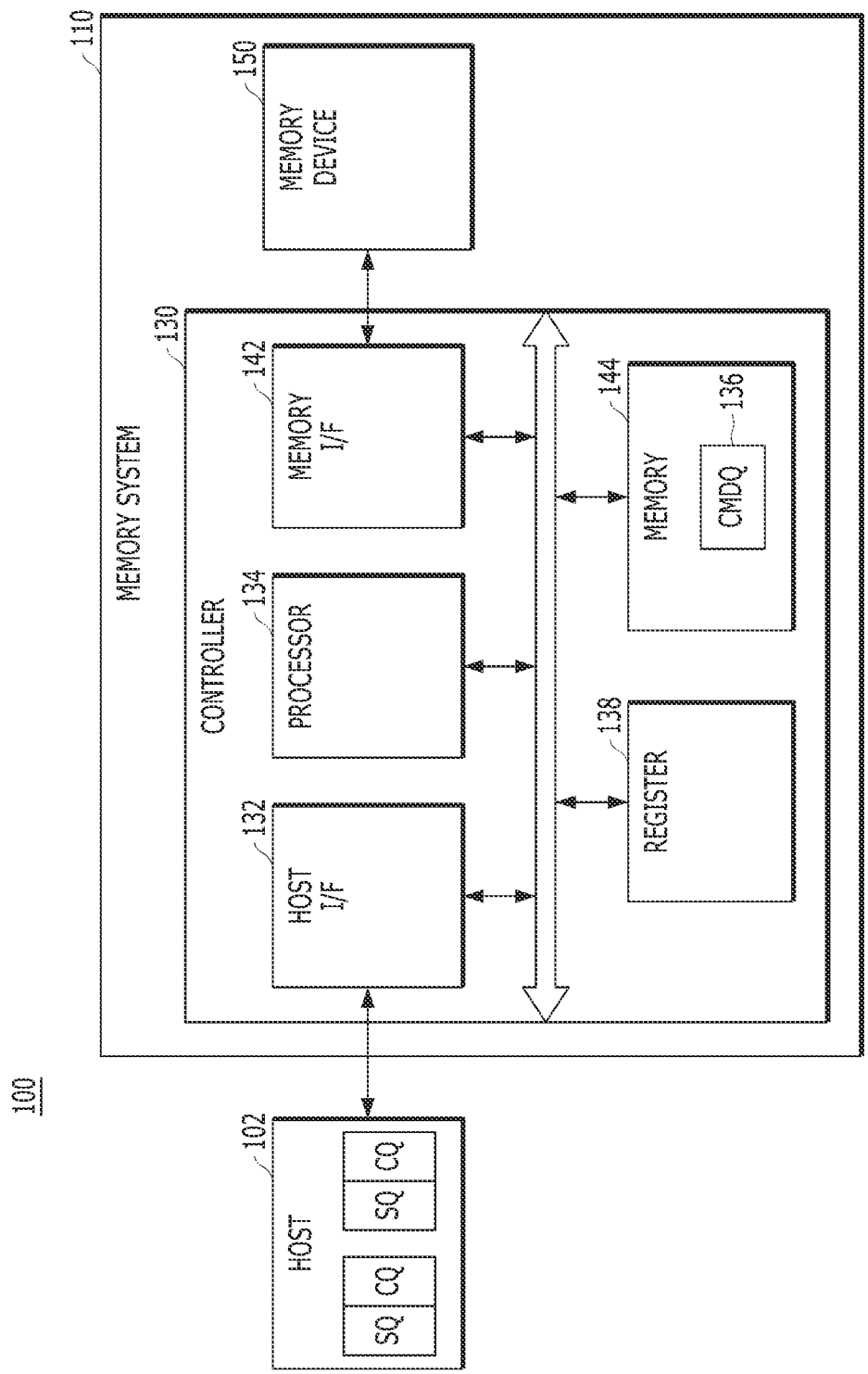
FIG. 1 is a diagram illustrating a data processing system in accordance with an embodiment of the disclosed technology.

FIG. 1 is a diagram schematically illustrating an example of a data processing system 100 including a memory system 110 in accordance with an embodiment of the disclosed technology.

Referring to FIG. 1, the data processing system 100 may include a host 102 operatively coupled to a memory system 110 in communication with the host 102.

The host 102 may include any of various portable electronic devices such as a mobile phone, MP3 player and laptop computer, or any of various non-portable electronic devices such as a desktop computer, a game machine, a television (TV), or a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request from the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card, or memory stick. The MMC may include an embedded MMC (eMMC), reduced size MMC (RS-MMC), micro-MMC, or others. The SD card may include a mini-SD card and/or micro-SD card.

The memory system 110 may be embodied as various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM), or a flash memory. The flash memory may have a 3-dimensional (3D) stack structure.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory system 110 may communicate with a host 102 by using a command queue interface that supports a protocol such as NVMe. The command queue interface may support an interface between the host 102 and the memory system 110 based on a queue pair including a submission queue SQ for inputting a requested command and a completion queue CQ for recording a processing result of the command.

Figure 2:
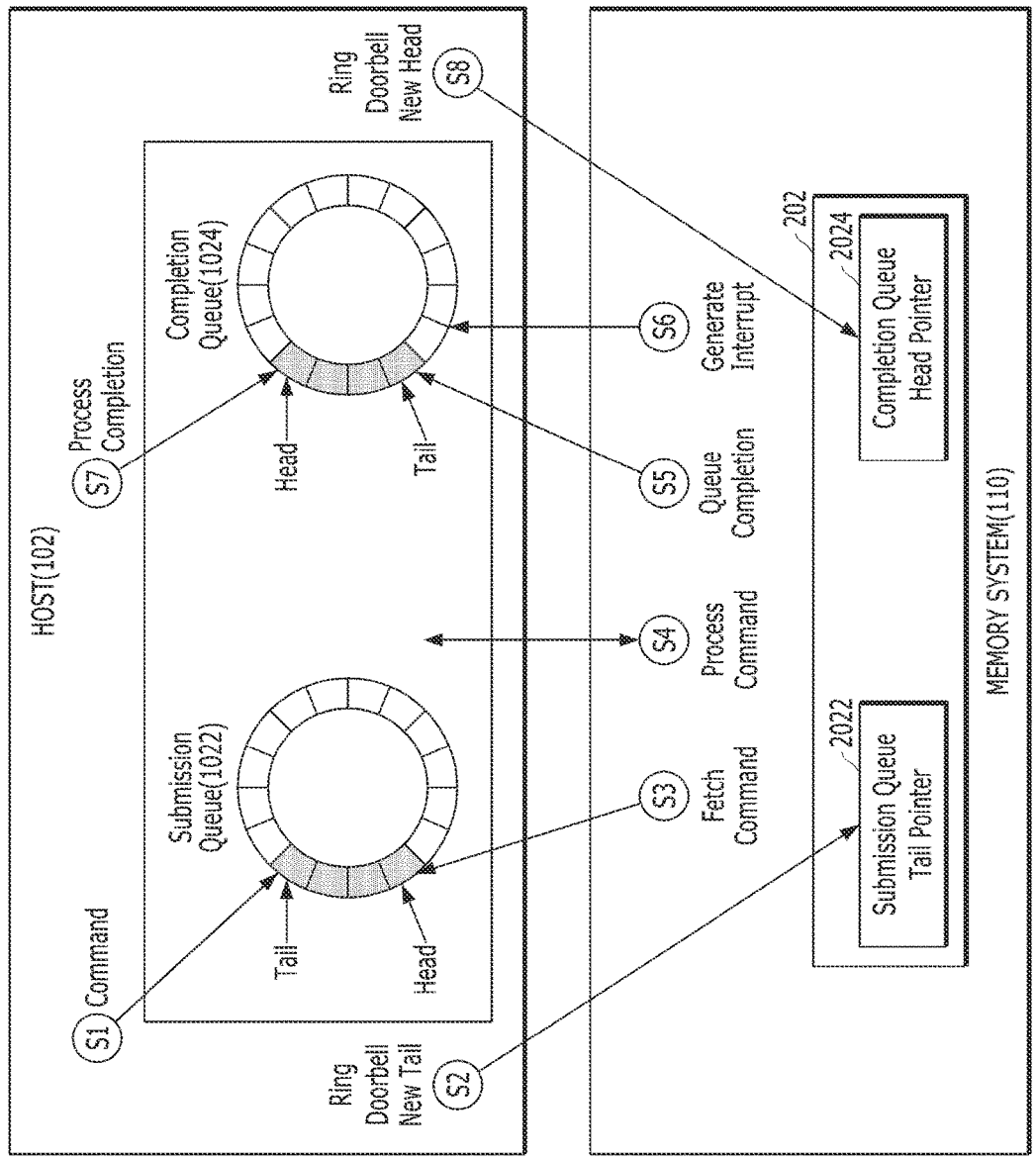
FIG. 2 is a diagram for explaining a command queue interface operation.

FIG. 2 is a diagram for explaining the command queue interface operation.

The host 102 may generate a queue pair including a submission queue 1022 and a completion queue 1024. When a plurality of cores exist in the host 102, the queue pair of the submission queue 1022 and the completion queue 1024 may be generated to correspond to one of the plurality of cores. In accordance with an embodiment, the queue pair may be stored in a memory of the host 102.

The memory system 110 may include a doorbell register 202 in order to perform the command queue interface operation. The memory system 100 communicates with the host 102 using a doorbell-based host interface which allows the host 102 putting descriptors on a memory ring for the memory system and issuing a pointer update write to the memory system 100, The pointer update write is referred to a "doorbell."

The doorbell register 202 may be a register for controlling the queue pair generated by the host 102. FIG. 2 illustrates one doorbell register 202 as an example, but when a plurality of cores exist in the host 102, the same number of doorbell registers 202 as the number of the cores may be included in the memory system 110. The doorbell register 202 may store a submission queue tail pointer 2022 indicating a tail of the submission queue 1022 and a completion queue head pointer 2024 indicating a head of the completion queue 1024. The memory system 110 may perform the command queue interface operation with the host 102 by accessing the submission queue 1022 and the completion queue 1024 with reference to the doorbell register 202.

In step S1, the host 102 may queue a command in the submission queue 1022 in order to request the memory system 110 to perform a command. In step S2, the host 102 may update the submission queue tail pointer 2022 and provide the updated submission queue tail pointer 2022 to the memory system 110. The memory system 110 may store the updated submission queue tail pointer 2022 in the doorbell register 202.

In step S3, the memory system 110 may fetch the command from the submission queue 1022. In step S4, the memory system 110 may process the fetched command.

In step S5, after the command has processed, the memory system 110 may record the completion of the command processing in the completion queue 1024. For example, the memory system 110 may write a completion queue entry in the completion queue 1024. In such a case, the completion queue head pointer 2024 may increase. In step S6, the memory system 110 may generate an interrupt signal.

In step S7, the host 102 may complete the command. In step S8, the host 102 may provide the updated completion queue head pointer 2024 to the memory system 110. For example, the memory system 110 may store the updated completion queue head pointer 2024 in the doorbell register 202.

Referring back to FIG. 1, the memory system 110 may include a memory device 150 and a controller 130. The memory device 150 may store data for the host 102, and the controller 130 may control the storage of the data into the memory device 150.

The controller 130 and the memory device 150 may be integrated into a single semiconductor device. For example, the controller 130 and the memory device 150 may be integrated as one semiconductor device to configure a solid state drive (SSD). When the memory system 110 is implemented as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a register 138, a memory interface (I/F) 142, and a memory 144, which are electrically connected to each other to be operable or in communication through an internal bus.

The host I/F 132 may be configured to process commands and data of the host 102, and communicate with the host 102 through an interface protocol such as peripheral component interconnect-express (PCIe).

The host I/F 132 may be driven through firmware referred to as a host interface layer (HIL) in order to exchange data with the host.

The host I/F 132 may be a command queue interface as described with reference to FIG. 2, and may support interfacing between the host 102 and the memory system 110.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL).

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

The processor 134 may drive the FTL and perform a foreground operation corresponding to a request received from the host. For example, the processor 134 may control a write operation of the memory device 150 in response to a write request from the host and control a read operation of the memory device 150 in response to a read request from the host.

Also, the controller 130 may perform a background operation onto the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations. For example, the memory 144 may include a command (CMD) queue 136 that queues commands fetched from the host 102.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The register 138 may include the doorbell register 202. For example, the register 138 may include the same number of doorbell registers 202 as the number of cores of the host 102. As described with reference to FIG. 2, the doorbell register 202 may store data for performing the command queue interface operation. FIG. 1 illustrates an example in which the register 138 is separated from the processor 134. However, in accordance with an embodiment, the register 138 may also be included in the processor 134.

In accordance with an embodiment of the disclosed technology, the doorbell register 202 may further store command information as well as the submission queue tail pointer 2022 and the completion queue head pointer 2024, which are described with reference to FIG. 2.

Figure 3:
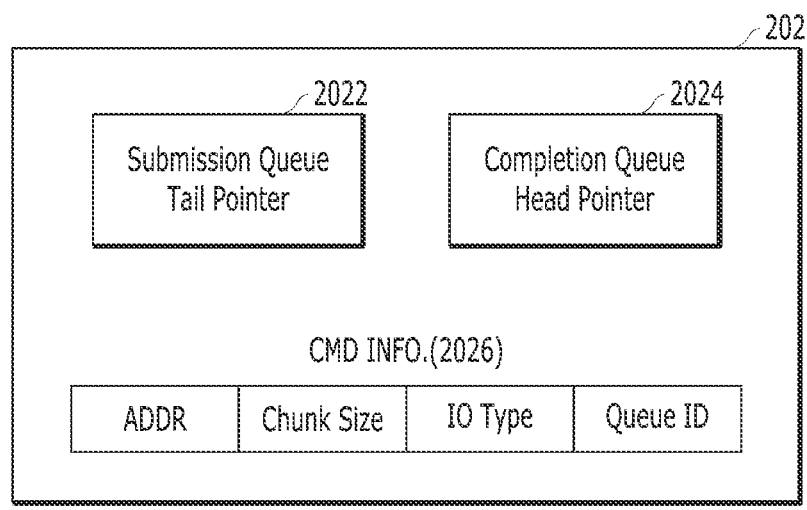
FIG. 3 is a diagram illustrating a doorbell register that further stores command information in accordance with an embodiment of the disclosed technology.

FIG. 3 illustrates the doorbell register 202 that further stores command information 2026 in addition to the submission queue tail pointer 2022 and the completion queue head pointer 2024 in accordance with an embodiment of the disclosed technology.

The host 102 may transmit the updated submission queue tail pointer 2022 to the memory system 110 together with the command information 2026 on a command corresponding to the submission queue tail pointer 2022. The command corresponding to the submission queue tail pointer 2022 refers to a command queued at a position indicated by the submission queue tail pointer 2022 in the submission queue 1022. The memory system 110 may store the updated submission queue tail pointer 2022 in the doorbell register 202 together with the command information 2026.

In accordance with an embodiment of the disclosed technology, the memory system 110 can acquire the command information 2026 on a command that has been queued in the submission queue 1022 of the host 102, but has not yet been fetched. Hereinafter, a command that has been queued in the submission queue 1022 of the host 102, but has not yet been fetched in the memory system 110 will be referred to as an unfetched command. The host I/F 132 may perform a pre-operation, such as allocating a buffer area for unfetched commands and determining an order in which the unfetched commands are queued in the command queue, based on the acquired command information 2026.

With the capabilities of the memory system 110 to perform the pre-operation on the unfetched command, the processing speed of the command can be improved. For example, the specification of the memory system 110 can require that a fail response is provided when commands from the host 102 are not processed within a predetermined processing time. The command processing time may be counted from when the doorbell rings, e.g., when the submission queue tail pointer 2022 indicating a position at which a corresponding command has been queued is stored in the doorbell register 202.

It may take a while until the doorbell corresponding to a certain command rings and then the command is fetched. If the memory system 110 can acquire command information only after fetching a command and interpreting the fetched command, any operation for the command being in an unfetched state is not performed by the memory system, which results in a waste of the predetermined processing time. Particularly, when the speed at which the submission queue tail pointer 2022 increases is faster than the speed at which the memory system 110 fetches a command, for the command queued relatively later in the submission queue, the time from when the doorbell rings and to when the command queued relatively later is fetched may be further increased. Accordingly, the memory system 110 may not process the command queued relatively later within the predetermined processing time and thus the memory system 110 ends up providing a fail response to the host 102.

In accordance with an embodiment of the disclosed technology, since the memory system 110 may perform a pre-operation on an unfetched command, it is possible to process the command without wasting the predetermined processing time. Accordingly, the memory system 110 can not only improve the processing speed of the command, but also provide a response desired by the host 102 by observing the predetermined processing time.

In accordance with an embodiment, the command information 2026 may store information on a command corresponding to the submission queue tail pointer 2022. In accordance with an embodiment, the command information 2026 may include start address information of a data chunk to be processed by the command, size information of the data chunk, input/output type information of the command, and identifier information on a queue in which the command has been queued. The start address information and the size information may be collectively referred to as address information. The input/output type of the command may be either a read type or a write type. The identifier information on a queue may indicate, when the host 102 includes a plurality of submission queues 1022, a submission queue 1022 in which the command has been queued.

In some implementations, even though the command information 2026 includes all of the start address information, the size information, the input/output type information, and the identifier information on a queue, the size of the command information 2026 may be only about several bytes to several tens of bytes. As the performance of the host I/F 132 is improved, the host 102 may provide the memory system 110 with several GB of data per second, for example. Accordingly, even though the host 102 provides the command information 2026 included in the doorbell register 202, it has almost no impact on the increase of the time required until the doorbell rings.

Figure 4:
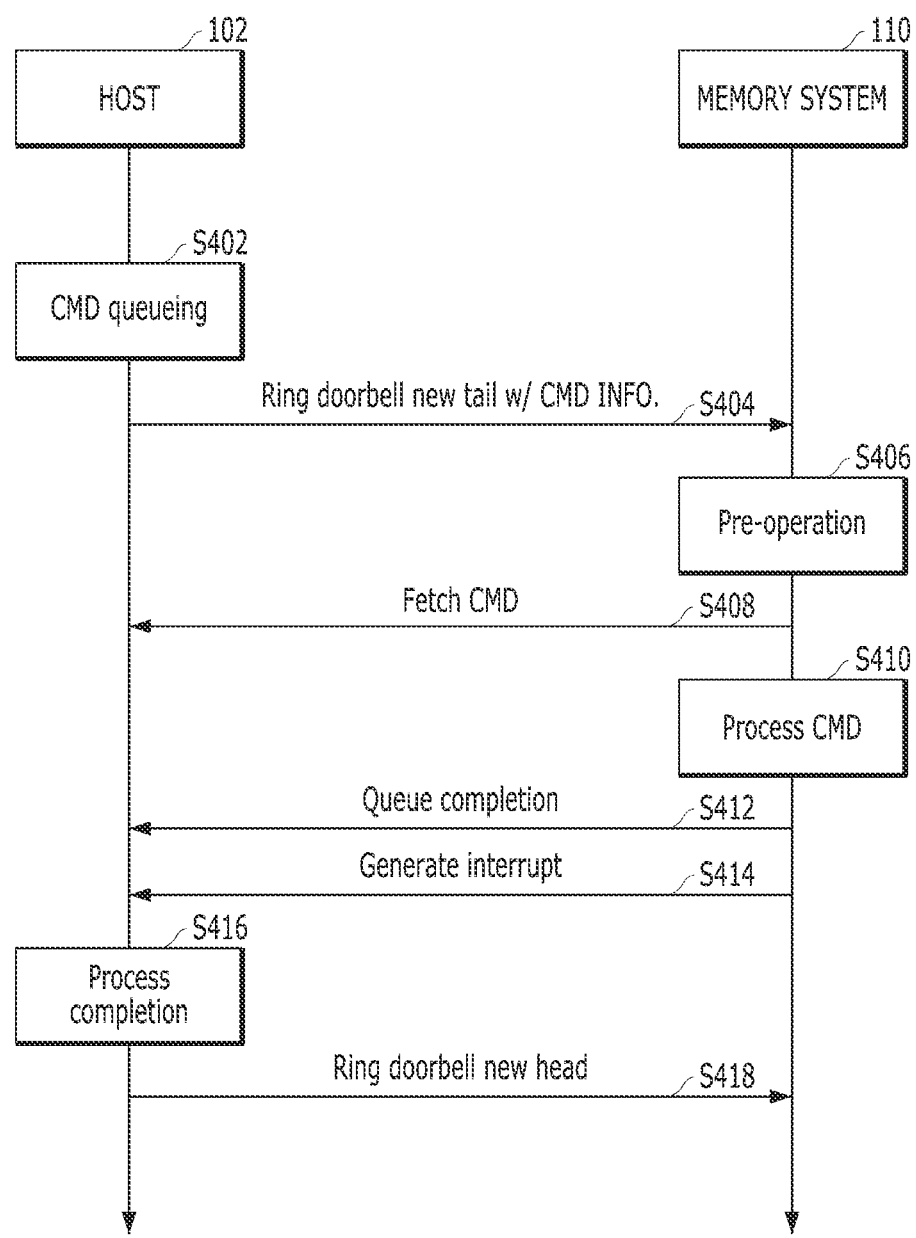
FIG. 4 is a diagram illustrating an operation of a data processing system in accordance with an embodiment of the disclosed technology.

FIG. 4 is a diagram illustrating an operation of the data processing system 100 in accordance with an embodiment of the present disclosure.

In step S402, the host 102 may queue a command in the submission queue 1022 and update the submission queue tail pointer 2022.

In step S404, the host 102 may ring the doorbell through the host I/F 132. For example, the host 102 may store an updated submission queue tail pointer 2022 in the doorbell register 202, and store the command information 2026 on a command corresponding to the submission queue tail pointer 2022.

In step S406, the host I/F 132 may perform a pre-operation for processing the command based on the command information 2026. For example, as the pre-operation, the host I/F 132 may determine a processing order between unfetched commands and allocate a buffer area for the unfetched commands. The pre-operation in accordance with an embodiment of the present disclosure will be described in detail with reference to FIG. 5A to FIG. 5C.

In step S408, the host I/F 132 may fetch the command from the submission queue 1022. For example, the host I/F 132 may fetch the command by providing a memory read request to the host 102. The host I/F 132 may queue the fetched command in an internal command queue. The host I/F 132 may queue unfetched commands in the CMD queue 136 based on the processing order determined in step S406.

In step S410, the processor 134 may process the commands queued in the CMD queue 136. In a first example, the processor 134 may receive write data from the memory of the host 102 in order to process a write command, buffer the data into the buffer area allocated in step S406, and program the buffered data in the memory device 150. In a second example, the processor 134 may load data from the memory device 150 in order to process a read command, buffer the data into the allocated buffer area, and provide the buffered data to the host 102.

In step S412, the host I/F 132 may record the completion of the command processing in the completion queue 1024 after processing the command. For example, the host I/F 132 may write a completion queue entry in the completion queue 1024. In such a case, the completion queue head pointer 2024 may increase.

In step S414, the host I/F 132 may provide an interrupt signal to the host 102.

In step S416, the host 102 may complete the command.

In step S418, the host 102 may provide the updated completion queue head pointer 2024 to the memory system 110. The host I/F 132 may store the updated completion queue head pointer 2024 in the doorbell register 202.

Figure 5A:
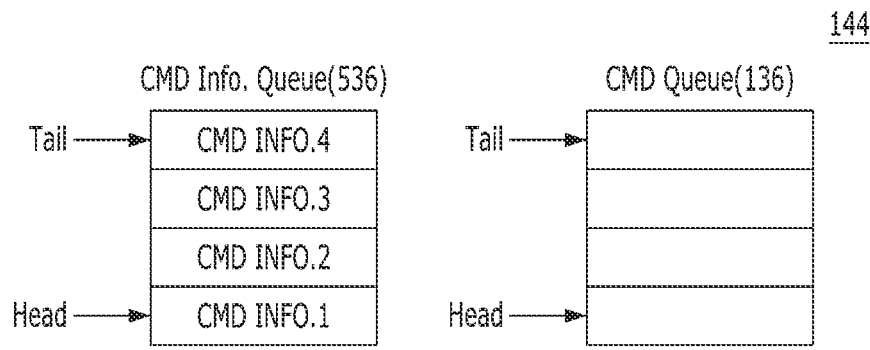
FIG. 5A to FIG. 5C are diagrams for explaining a pre-operation in accordance with an embodiment of the disclosed technology.
Figure 5B:
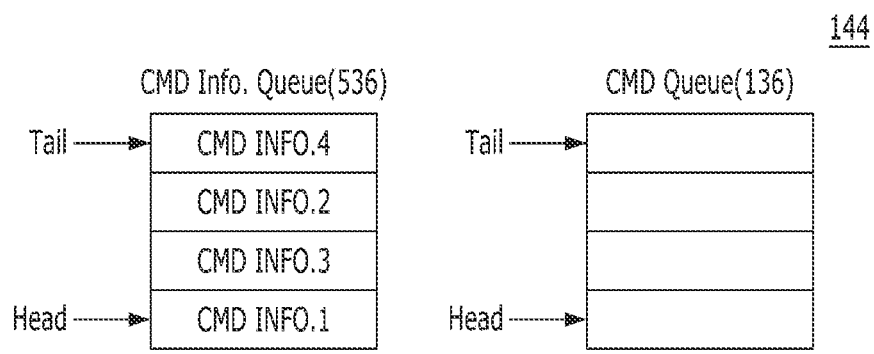
Figure 5C:
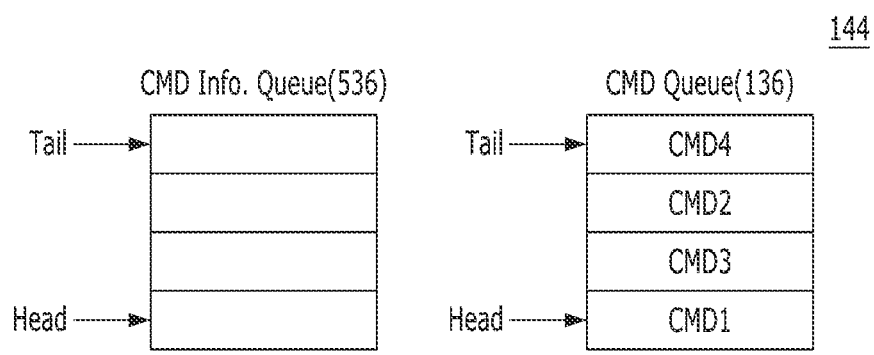

FIG. 5A to FIG. 5C are diagrams for explaining the pre-operation in accordance with an embodiment of the disclosed technology.

FIG. 5A to FIG. 5C illustrate the CMD queue 136 and a command information (CMD Info.) queue 536 that may be stored in the memory 144.

The CMD queue 136 may queue commands fetched from the host 102 as described with reference to FIG. 1. The CMD Info.queue 536 may queue command information on unfetched commands.

FIG. 5A illustrates a state in which no commands are queued in the CMD queue 136 and command information on unfetched commands are queued in the CMD Info.queue 536. For example, the host 102 may ring the doorbell in the order of first to fourth commands. The host I/F 132 may queue first to fourth command information, which correspond to the first to fourth commands, respectively, in the CMD Info.queue 536 in the order in which the doorbell rings.

The host I/F 132 may perform a pre-operation on the unfetched commands based on the command information 2026 on the unfetched commands.

In a first example of the pre-operation, the host I/F 132 may determine an order, in which the unfetched commands are processed, based on address information included in the command information 2026 on the unfetched commands.

In a second example of the pre-operation, the host I/F 132 may allocate a buffer area for the unfetched commands to the memory 144 based on the address information. For example, the host I/F 132 may determine the size of the buffer area to be allocated by referring to size information of a data chunk of the unfetched commands.

FIG. 5B illustrates that the order, in which the unfetched commands are processed, is changed by the host I/F 132.

For example, when an address of a first data chunk to be processed by the first command and an address of a third data chunk to be processed by the third command are continuous with each other, the host I/F 132 may change the processing order of the second command and the third command such that the first command and the third command may be continuously processed.

When queuing commands fetched from the submission queue 1022 in the CMD queue 136, the host I/F 132 may queue the commands in the order determined by the CMD Info.queue 536. For example, the host I/F 132 may fetch unfetched commands in an order in which they have been queued in the submission queue 1022, but when queuing the fetched commands in the CMD queue 136, the host I/F 132 may adjust an order between the commands queued in the CMD queue 136 by referring to the order determined by the CMD Info.queue 536.

FIG. 5C illustrates that the fetched commands are queued in the CMD queue 136 according to the changed order. For example, the CMD queue 136 may queue the first to fourth commands in the order of the first command, the third command, the second command, and the fourth command in the same order as the command processing order determined in FIG. 5B.

In accordance with an embodiment of the disclosed technology, when the host 102 rings the doorbell, the host I/F 132 may receive the command information 2026 as well as the submission queue tail pointer 2022. The host I/F 132 may perform a pre-operation on unfetched commands by using the command information 2026. For example, the pre-operation may include a buffer allocation operation for the unfetched commands and an operation of determining the processing order of the unfetched commands. After fetching the unfetched commands, the host I/F 132 may process the fetched commands based on the result of the pre-operation.

When performing the pre-operation on the unfetched commands, the host I/F 132 may skip performing the buffer allocation operation after fetching the commands. Therefore, the processing time of the fetched commands can be shortened. Furthermore, the host I/F 132 may process commands based on a processing order determined before the commands are fetched. Therefore, it is possible to efficiently process the commands.

Although an embodiment and various features of the disclosed technology are described, variations and enhancements of the disclosed embodiment and other embodiments may be made based on what is described and illustrated.

What is claimed is:

1. A data processing system comprising:
a memory system to store data and information; and
a host in communication with the memory system and including a submission queue for queueing one or more commands to be processed by the memory system, the host configured to provide the memory system with submission queue tail pointers indicating tails of the submission queue and command information on the one or more commands,
wherein the memory system is configured to receive the command information on the one or more commands, perform a pre-operation on the one or more commands based on the command information, and fetch the one or more commands from the submission queue according to a first order, and
wherein the memory system is further configured to perform the pre-operation by determining a processing order of the one or more commands, and queue, after fetching of the one or more commands from the submission queue, the one or more commands in a command queue included in the memory system according to the processing order different from the first order,
wherein the memory system further comprises a command information queue configured to queue, before the pre-operation, the command information on the one or more commands in a second order related to the submission queue tail pointers.

2. The data processing system of claim 1, wherein the pre-operation includes an operation performed prior to fetching the one or more commands and processing the one or more commands.

3. The data processing system of claim 1, wherein the memory system is further configured to process a queued command queued in the command queue, and provide a completion response to a completion queue of the host.

4. The data processing system of claim 1, wherein the command information includes at least one of address information, command type information, or submission queue identifier information.

5. The data processing system of claim 1, wherein the memory system is configured to fetch the one or more commands according to the first order in which the one or more commands are queued in the submission queue.

6. The data processing system of claim 4, wherein the address information includes at least one of start address information of a data chunk to be processed by a command, or size information of the data chunk.

7. The data processing system of claim 6, wherein the memory system is configured to perform the pre-operation by allocating a buffer area included in the memory system for the command based on the size information of the data chunk.

8. A memory system comprising:
a memory device configured to store data;
a host interface in communication with a host and configured to receive submission queue tail pointers and command information on one or more commands corresponding to the submission queue tail pointers from the host, perform a pre-operation on the one or more commands based on the command information, and fetch the one or more commands from a submission queue of the host according to a first order;
a command queue configured to queue a fetched command; and
a processor in communication with the memory device and configured to control the memory device to process the fetched command queued in the command queue, and wherein the host interface is further configured to perform the pre-operation by determining a processing order of the one or more commands, and queue, after fetching of the one or more commands from the submission queue, the one or more commands in the command queue according to the processing order different from the first order, wherein the memory system further includes a command information queue configured to queue, before the pre-operation, command information on the one or more commands in a second order related to the submission queue tail pointers.

9. The memory system of claim 8, wherein the host interface is further configured to provide a completion response to a completion queue of the host in response to a completion of processing of the fetched command.

10. The memory system of claim 8, wherein the command information includes at least one of address information, command type information, or submission queue identifier information.

11. The memory system of claim 10, wherein the host interface is further configured to receive additional command information on the one or more commands from the host and the additional command information includes at least one of address information, command type information, or submission queue identifier information.

12. The memory system of claim 11, wherein the processing order of the one or more commands is based on the address information of each of the one or more commands.

13. The memory system of claim 12, wherein the host interface is configured to fetch the one or more commands according to the first order in which the one or more commands are queued in the submission queue.

14. The memory system of claim 10, wherein the address information includes at least one of start address information of a data chunk to be processed by the command, or size information of the data chunk.

15. The memory system of claim 14, wherein the host interface is further configured to perform the pre-operation by allocating a buffer area included in the memory system for the one or more commands based on the size information of the data chunk.

16. The data processing system of claim 1, wherein the memory system is configured to receive the command information on the one or more commands that have been queued in the submission queue of the host but have not been fetched.

17. The memory system of claim 8, wherein the command information is associated with the one or more commands that have been queued in the submission queue of the host but have not been fetched.

* * * * *